(12) United States Patent
Wada et al.

(10) Patent No.: US 12,511,377 B2
(45) Date of Patent: Dec. 30, 2025

(54) INFORMATION PROCESSING DEVICE AND METHOD FOR CONTROLLING INFORMATION PROCESSING DEVICE

(71) Applicant: Panasonic Automotive Systems Co., Ltd., Kanagawa (JP)

(72) Inventors: Hiroyuki Wada, Kyoto (JP); Kaoru Yokota, Hyogo (JP); Yuishi Torisaki, Osaka (JP); Takumaru Nagai, Osaka (JP); Nobutaka Kawaguchi, Osaka (JP)

(73) Assignee: PANASONIC AUTOMOTIVE SYSTEMS CO., LTD, Kanagawa (JP)

( * ) Notice: Subject to any disclaimer, the term of this patent is extended or adjusted under 35 U.S.C. 154(b) by 0 days.

(21) Appl. No.: 19/025,371

(22) Filed: Jan. 16, 2025

(65) Prior Publication Data
US 2025/0156533 A1   May 15, 2025

Related U.S. Application Data

(63) Continuation of application No. PCT/JP2023/022567, filed on Jun. 19, 2023.

(30) Foreign Application Priority Data

Sep. 27, 2022   (JP) ................. 2022-153920

(51) Int. Cl.
  *G06F 21/55*   (2013.01)
(52) U.S. Cl.
  CPC .......... *G06F 21/552* (2013.01); *G06F 21/554* (2013.01)
(58) Field of Classification Search
  CPC .............. G06F 21/552; G06F 21/554
  (Continued)

(56) References Cited

U.S. PATENT DOCUMENTS 9,860,265 B2 *  1/2018  Gula ................. H04L 67/10
10,893,063 B2 *  1/2021  Sasaki ............... G06F 11/0778
(Continued)

FOREIGN PATENT DOCUMENTS

JP  2019-125344 A  7/2019
JP  2020-129238 A  8/2020
(Continued)

OTHER PUBLICATIONS

International Search Report issued in WIPO Patent Application No. PCT/JP2023/022567, dated Aug. 15, 2023, along with an English translation thereof.
(Continued)

*Primary Examiner* — Taghi T Arani
*Assistant Examiner* — Pegah Barzegar
(74) *Attorney, Agent, or Firm* — GREENBLUM & BERNSTEIN, P.L.C.

(57) ABSTRACT

An information processing device includes: a log storage that stores a monitoring log; a log transmitter that transmits a monitoring log stored in the log storage to an SOC at a first timing; a first anomaly detector that detects a presence or absence of an anomaly in the information processing device; an integrated monitor that verifies an integrity of each of the log transmitter and the first anomaly detector; a root monitor that verifies an integrity of the integrated monitor; a determiner that determines an intrusion depth based on a monitoring log stored in the log storage when an anomaly due to an attack occurs; and a transmission controller that changes, based on the intrusion depth, a timing of transmission of a monitoring log by the log transmitter from the first timing to a second timing that is earlier than the first timing.

7 Claims, 11 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 12,039,039 | B1* | 7/2024 | Yokota | G06F 21/575 |
| 12,107,876 | B2* | 10/2024 | Kishikawa | H04L 63/02 |
| 2015/0188932 | A1* | 7/2015 | King | H04L 63/1408 726/22 |
| 2017/0013005 | A1* | 1/2017 | Galula | H04L 63/1425 |
| 2018/0210801 | A1* | 7/2018 | Wu | G06F 11/3495 |
| 2018/0307576 | A1* | 10/2018 | Debnath | G06F 11/34 |
| 2018/0330091 | A1* | 11/2018 | Prowell | G06F 21/552 |
| 2019/0319983 | A1* | 10/2019 | Shi | H04L 63/1408 |
| 2020/0053112 | A1* | 2/2020 | Torisaki | H04L 63/1425 |
| 2021/0237665 | A1* | 8/2021 | Tamura | G06F 21/554 |
| 2021/0349997 | A1* | 11/2021 | Hirano | G06F 21/56 |
| 2022/0019662 | A1* | 1/2022 | Ishida | H04W 4/44 |
| 2022/0182404 | A1* | 6/2022 | Kishikawa | H04L 63/1416 |
| 2022/0407873 | A1* | 12/2022 | Morita | H04L 67/12 |
| 2024/0331325 | A1* | 10/2024 | Hirai | G06F 3/011 |
| 2025/0080566 | A1* | 3/2025 | Torisaki | H04L 63/1433 |
| 2025/0156533 | A1* | 5/2025 | Wada | G06F 11/34 |

FOREIGN PATENT DOCUMENTS

| | | |
|---|---|---|
| JP | 2022-017995 A | 1/2022 |
| WO | WO2019/142741 A1 | 7/2019 |
| WO | WO2021/039851 A1 | 3/2021 |

OTHER PUBLICATIONS

Written Opinion of the International Searching Authority (WO/ISA) issued in WIPO Patent Application No. PCT/JP2023/022567, dated Aug. 15, 2023, along with an English translation thereof.

* cited by examiner

FIG. 3

| Anomaly location | Intrusion depth |
|---|---|
| First anomaly detector | Level 0 |
| Second anomaly detector | Level 1 |
| Integrated monitor | Level 2 |
| First anomaly detector + second anomaly detector | Level 1 |
| First anomaly detector + integrated monitor | Level 2 |

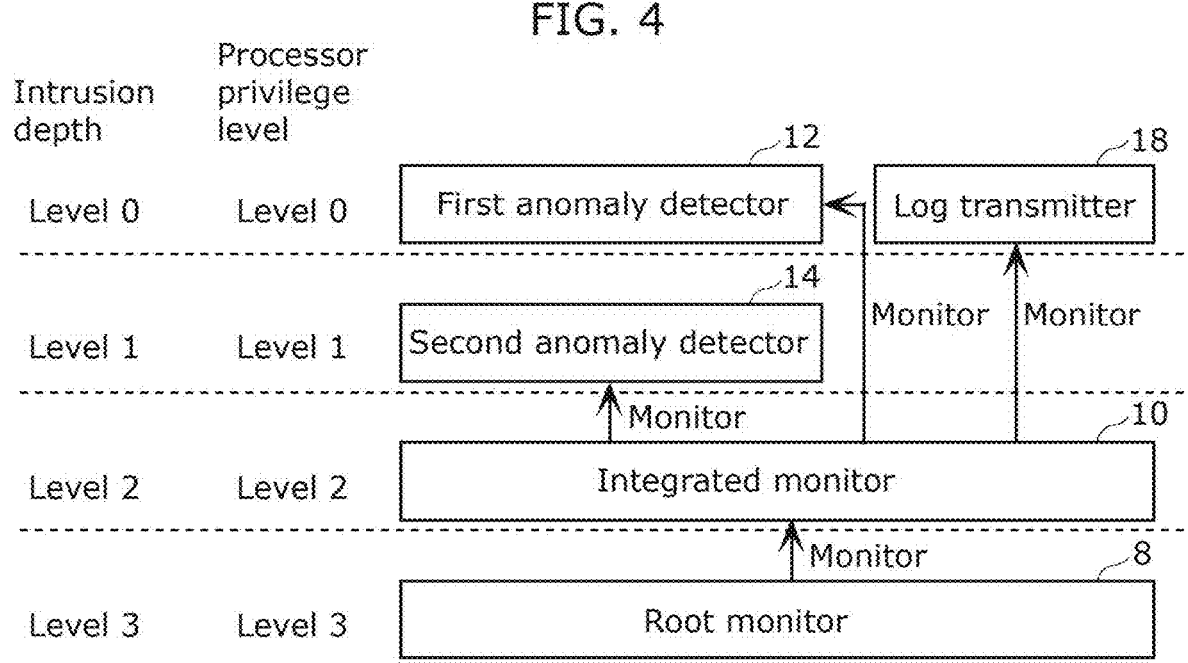

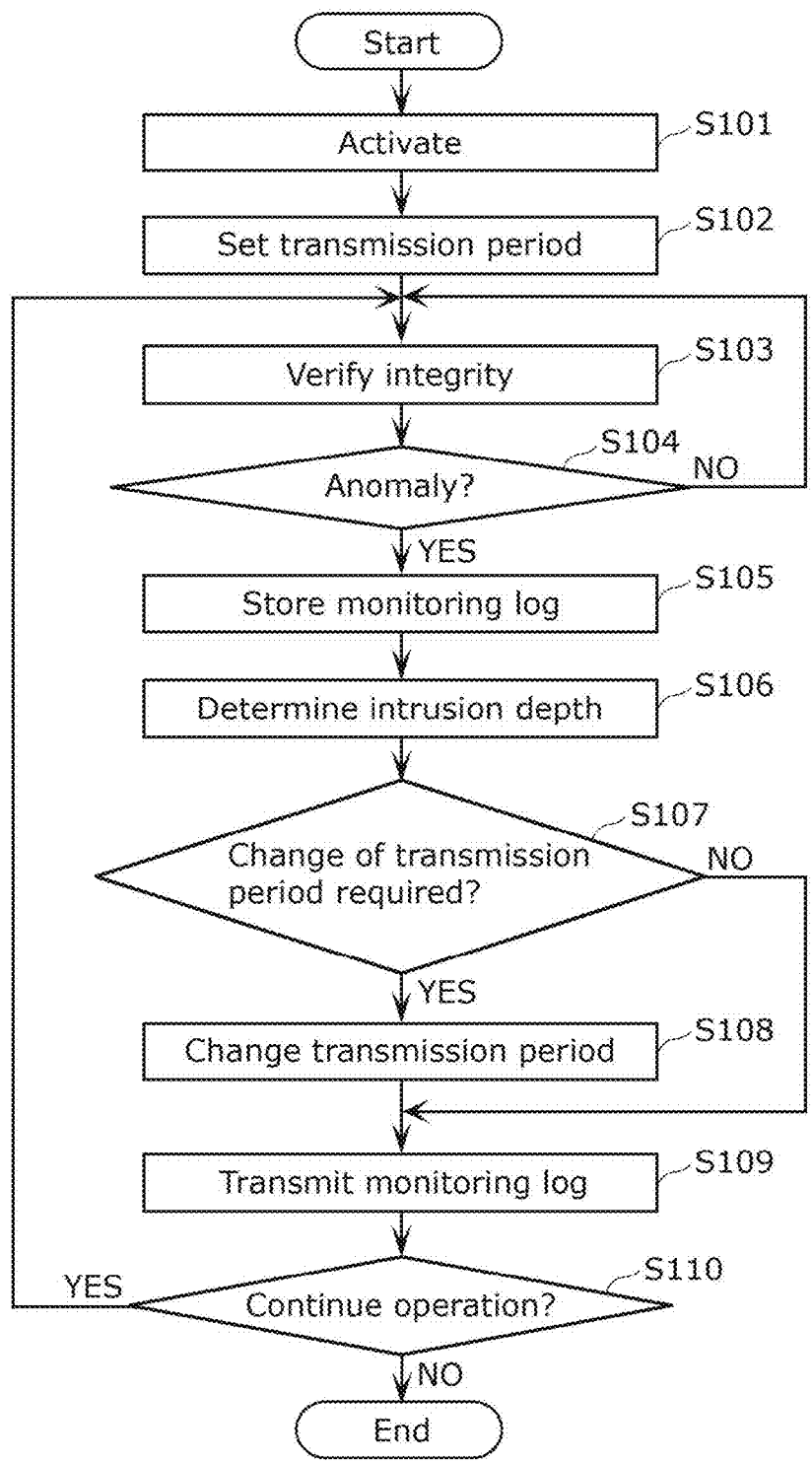

| Anomaly location | Effective path |
|---|---|
| First anomaly detector | P2, P3, P4 |
| Second anomaly detector | P1, P3, P4 |
| Integrated monitor | P1, P4 |
| First anomaly detector + second anomaly detector | P3, P4 |
| First anomaly detector + integrated monitor | P4 |

ND METHOD FOR CONTROLLING
INFORMATION PROCESSING DEVICE AND METHOD FOR CONTROLLING INFORMATION PROCESSING DEVICE

CROSS REFERENCE TO RELATED APPLICATIONS

This is a continuation application of PCT International Application No. PCT/JP2023/022567 filed on Jun. 19, 2023, designating the United States of America, which is based on and claims priority of Japanese Patent Application No. 2022-153920 filed on Sep. 27, 2022.

FIELD

The present disclosure relates to an information processing device and a method for controlling an information processing device.

BACKGROUND

As security measures for firmware, not only integrity verification (secure boot) at the time of firmware startup but also constant integrity (runtime integrity (RI)) verification, i.e. integrity verification repeatedly performed after firmware startup, is desired.

An information processing device used in conventional security measures includes a monitor that operates in a non-secure region and a log collector that operates in a secure region (see, for example, Patent Literature (PTL) 1). The monitor monitors the presence or absence of an anomaly in the information processing device. The monitor then generates a monitoring log that indicates the monitoring result, and stores the generated monitoring log in a first memory. The log collector collects the monitoring log stored in the first memory, and stores the collected monitoring log in a second memory. The monitoring log stored in the second memory is transmitted to a security operation center (SOC).

CITATION LIST

Patent Literature

PTL 1: Japanese Unexamined Patent Application Publication No. 2020-129238

SUMMARY

However, the foregoing conventional information processing device can be improved upon.

In view of this, the present disclosure provides an information processing device and a method for controlling an information processing device capable of improving upon the above related art.

An information processing device according to an aspect of the present disclosure includes: a storage that stores a monitoring log generated in the information processing device; a transmitter that is capable of communicating with an external device and transmits a monitoring log stored in the storage to the external device at a first timing; an anomaly detector that detects a presence or absence of an anomaly in the information processing device and generates a monitoring log that indicates a detection result; a first monitor that verifies an integrity of each of the transmitter and the anomaly detector and generates a monitoring log that indicates a verification result; a second monitor that verifies an integrity of the first monitor and generates a monitoring log that indicates a verification result; a determiner that determines an intrusion depth that indicates a degree of progress of an attack based on a monitoring log stored in the storage when an anomaly due to the attack occurs in at least one of the anomaly detector or the first monitor; and a transmission controller that changes, based on the intrusion depth, a timing of transmission of a monitoring log by the transmitter from the first timing to a second timing that is earlier than the first timing when the anomaly due to the attack occurs in at least one of the anomaly detector or the first monitor.

Note that these general or specific aspects may be implemented as a system, a method, an integrated circuit, a computer program, a computer-readable recording medium such as a compact disc-read only memory (CD-ROM), or as any combination of systems, methods, integrated circuits, computer programs, and recording media.

An information processing device or the like according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a diagram illustrating an example of first countermeasure information according to Embodiment 1.

FIG. 4 is a diagram for describing an intrusion depth.

FIG. 5 is a diagram illustrating an example of second countermeasure information according to Embodiment 1.

FIG. 6 is a flowchart illustrating a flow of an operation of the information processing device according to Embodiment 1.

DESCRIPTION OF EMBODIMENTS

Figure 1:
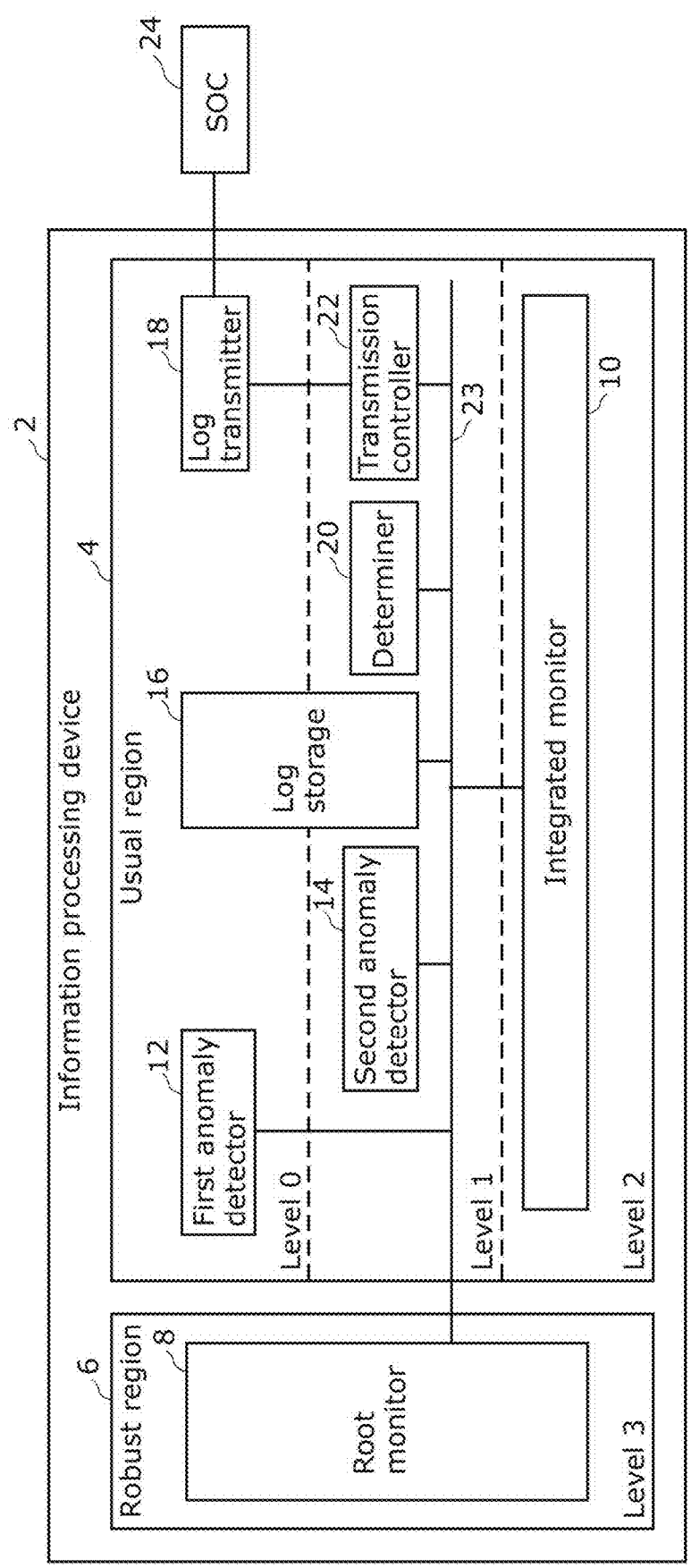
FIG. 1 is a block diagram illustrating a configuration of an information processing device according to Embodiment 1.

Underlying Knowledge Forming Basis of the Present Disclosure

The present inventors have found the following regarding the technique described in the Background section above.

With the foregoing conventional information processing device, the integrity of the operation of transmitting a monitoring log to SOC is not ensured.

To address this, the present inventors have devised the following information processing device and the like.

An information processing device according to a first aspect of the present disclosure includes: a storage that stores a monitoring log generated in the information processing device; a transmitter that is capable of communicating with an external device and transmits a monitoring log stored in the storage to the external device at a first timing; an anomaly detector that detects a presence or absence of an anomaly in the information processing device and generates a monitoring log that indicates a detection result; a first monitor that verifies an integrity of each of the transmitter and the anomaly detector and generates a monitoring log that indicates a verification result; a second monitor that verifies an integrity of the first monitor and generates a monitoring log that indicates a verification result; a determiner that determines an intrusion depth that indicates a degree of progress of an attack based on a monitoring log stored in the storage when an anomaly due to the attack occurs in at least one of the anomaly detector or the first monitor; and a transmission controller that changes, based on the intrusion depth, a timing of transmission of a monitoring log by the transmitter from the first timing to a second timing that is earlier than the first timing when the anomaly due to the attack occurs in at least one of the anomaly detector or the first monitor.

According to the present aspect, when an anomaly due to an attack occurs in at least one of the anomaly detector or the first monitor, the transmission controller changes, based on the intrusion depth, the timing of transmission of a monitoring log by the transmitter from the first timing to the second timing that is earlier than the first timing. Therefore, before the attack further intrudes and reaches the transmitter, the transmitter can transmit early, to the external device, a monitoring log that indicates the occurrence of the anomaly. As a result, by analyzing the monitoring log received from the information processing device, the external device can detect that the anomaly has occurred in the information processing device.

In addition, with the information processing device according to a second aspect of the present disclosure, in the first aspect, the transmitter may transmit the monitoring log to the external device with a first period, and when the anomaly due to the attack occurs in at least one of the anomaly detector or the first monitor, the transmission controller may change, based on the intrusion depth, a period of transmission of a monitoring log by the transmitter from the first period to a second period that is shorter than the first period.

According to the present aspect, the transmission controller can easily control the period of transmission of a monitoring log by the transmitter.

In addition, with the information processing device according to a third aspect of the present disclosure, in the second aspect, the transmission controller may set the second period to make the second period shorter as the intrusion depth is deeper.

According to the present aspect, before the attack further intrudes and reaches the transmitter, the transmitter can transmit, earlier and with higher reliability to the external device, a monitoring log that indicates the occurrence of the anomaly.

In addition, with the information processing device according to a fourth aspect of the present disclosure, in the second aspect or the third aspect, when the anomaly due to the attack occurs in at least one of the anomaly detector or the first monitor, the determiner may further determine an effective path that is a path that has not been subjected to attack intrusion, and when the anomaly due to the attack occurs in at least one of the anomaly detector or the first monitor, the transmission controller may further extract, as a transmission target of the transmitter, a particular monitoring log generated on the effective path from among one or more monitoring logs stored in the storage based on the effective path.

According to the present aspect, the amount of monitoring logs transmitted by the transmitter can be reduced. As a result, the transmitter can transmit, earlier to the external device, a monitoring log that indicates the occurrence of the anomaly.

A method for controlling an information processing device according to a fifth aspect of the present disclosure is a method for controlling an information processing device that includes: a storage that stores a monitoring log generated in the information processing device; a transmitter that is capable of communicating with an external device and transmits a monitoring log stored in the storage to the external device at a first timing; an anomaly detector that detects a presence or absence of an anomaly in the information processing device and generates a monitoring log that indicates a detection result; a first monitor that verifies an integrity of each of the transmitter and the anomaly detector and generates a monitoring log that indicates a verification result; and a second monitor that verifies an integrity of the first monitor and generates a monitoring log that indicates a verification result, the method including: determining an intrusion depth that indicates a degree of progress of an attack based on a monitoring log stored in the storage when an anomaly due to the attack occurs in at least one of the anomaly detector or the first monitor; and changing, based on the intrusion depth, a timing of transmission of a monitoring log by the transmitter from the first timing to a second timing that is earlier than the first timing when the anomaly due to the attack occurs in at least one of the anomaly detector or the first monitor.

According to the present aspect, when an anomaly due to an attack occurs in at least one of the anomaly detector or the first monitor, the transmission controller changes, based on the intrusion depth, the timing of transmission of a monitoring log by the transmitter from the first timing to the second timing that is earlier than the first timing. Therefore, before the attack further intrudes and reaches the transmitter, the transmitter can transmit early, to the external device, a monitoring log that indicates the occurrence of the anomaly. As a result, by analyzing the monitoring log received from the information processing device, the external device can detect that the anomaly has occurred in the information processing device.

Note that these general or specific aspects may be implemented as a system, a method, an integrated circuit, a computer program, a computer-readable recording medium such as a CD-ROM, or as any combination of systems, methods, integrated circuits, computer programs, or recording media.

In the following, embodiments will be specifically described with reference to the drawings.

Note that the following embodiments each illustrate a general or specific example. The numerical values, shapes, materials, constituent elements, the arrangement and connection of the constituent elements, steps, the processing order of the steps etc. illustrated in the following embodiments are mere examples, and are not intended to limit the present disclosure. Among the constituent elements in the following embodiments, those not recited in any of the independent claims representing the most generic concepts will be described as optional constituent elements.

Embodiment 1

1-1. Configuration of Information Processing Device

Figure 2:
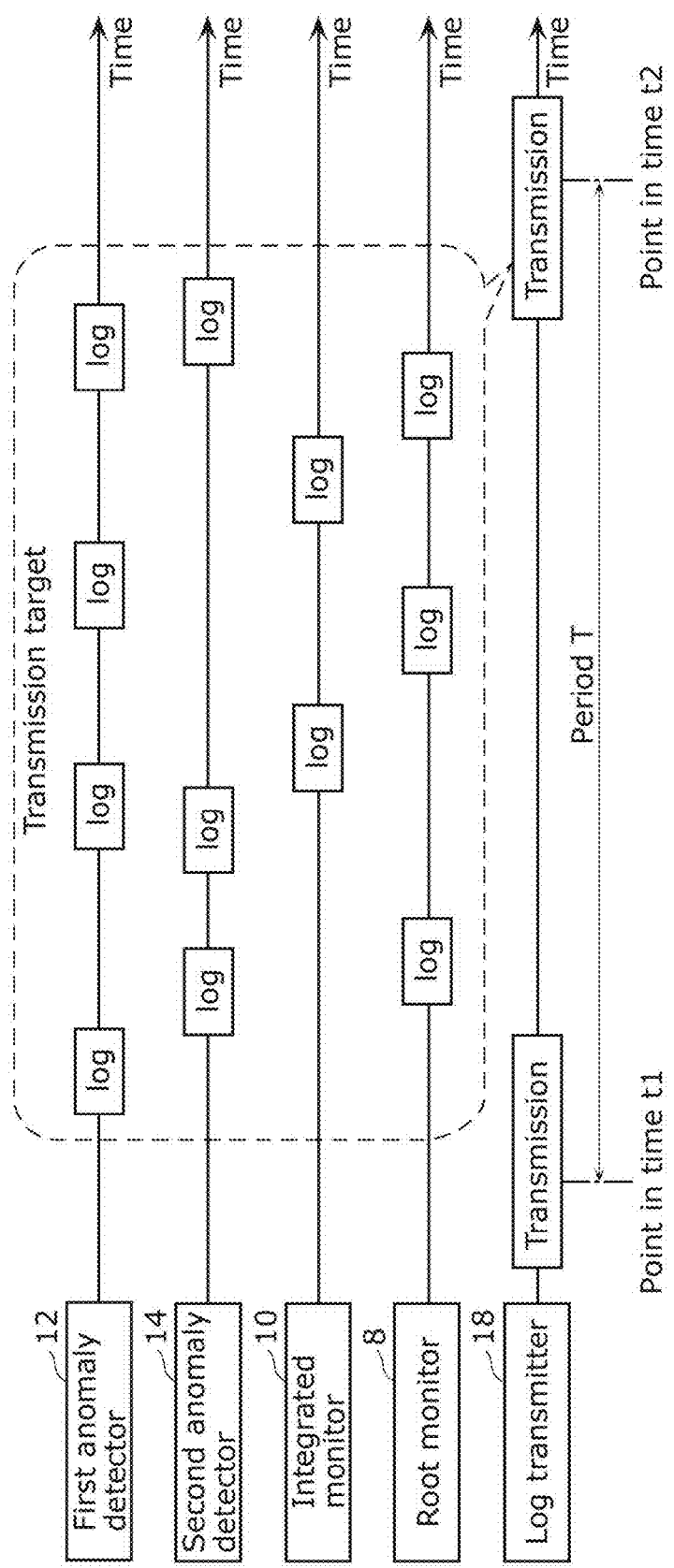
FIG. 2 is a timing chart for describing a transmission process for a monitoring log by a log transmitter in the absence of an attack on the information processing device according to Embodiment 1.

First, with reference to FIGS. 1 to 5, a configuration of information processing device 2 according to Embodiment 1 will be described. FIG. 1 is a block diagram illustrating a configuration of information processing device 2 according to Embodiment 1. FIG. 2 is a timing chart for describing a transmission process for a monitoring log by log transmitter 18 in the absence of an attack on information processing device 2 according to Embodiment 1. FIG. 3 is a diagram illustrating an example of first countermeasure information 26 according to Embodiment 1. FIG. 4 is a diagram for describing an intrusion depth. FIG. 5 is a diagram illustrating an example of second countermeasure information 28 according to Embodiment 1.

Information processing device 2 is applied as an electronic control unit (ECU) mounted on a vehicle, such as an automobile, for example. After activation of various computer programs (hereinafter simply referred to as program) in information processing device 2, information processing device 2 performs constant integrity (RI) verification, i.e., repeatedly performs integrity verification for the various programs.

Note that in this specification, "integrity" means that the program in information processing device 2 has not been subjected to unauthorized tampering or the like. Furthermore, "have an integrity anomaly" means a state of the program in information processing device 2 that has been subjected to unauthorized tampering or the like and is compromised.

As illustrated in FIG. 1, information processing device 2 has a structure virtually separated into usual region 4 and robust region 6. Usual region 4 is an execution environment for executing an insecure operating system and an insecure application. Robust region 6 is an execution environment for executing a secure operating system and a secure application, and is isolated from usual region 4. That is, robust region 6 is a more secure execution environment than usual region 4. For example, robust region 6 is implemented (for example, subjected to obfuscation or hardening) so as to be more difficult to be analyzed than usual region 4, and access from usual region 4 to robust region 6 is restricted by a function of a processor or the like forming information processing device 2.

Furthermore, information processing device 2 includes root monitor 8 (an example of a second monitor), integrated monitor 10 (an example of a first monitor), a first anomaly detector 12 (an example of an anomaly detector), a second anomaly detector 14 (an example of the anomaly detector), log storage 16 (an example of a storage), log transmitter 18 (an example of a transmitter), determiner 20, and transmission controller 22.

In information processing device 2, root monitor 8 is used as a root of trust to perform constant integrity verification for various programs, i.e., repeatedly perform integrity verification for various programs. Root monitor 8, integrated monitor 10, first anomaly detector 12, second anomaly detector 14, log storage 16, log transmitter 18, determiner 20, and transmission controller 22 are connected so as to be communicable with each other via bus 23.

Note that each of root monitor 8, integrated monitor 10, first anomaly detector 12, second anomaly detector 14, log transmitter 18, determiner 20, and transmission controller 22 is implemented by a program executer, such as a central processing unit (CPU) or a processor, reading and executing a program recorded in a memory.

Root monitor 8 is implemented at processor privilege level 3 in robust region 6 and monitors integrated monitor 10. Specifically, after activation of integrated monitor 10, root monitor 8 performs constant integrity verification for integrated monitor 10 by repeatedly performing integrity verification for integrated monitor 10. When it is verified that integrated monitor 10 has an integrity anomaly, root monitor 8 generates a monitoring log that indicates the verification result. Note that root monitor 8 may generate a monitoring log that indicates the verification result when it is verified that integrated monitor 10 has no integrity anomaly.

Integrated monitor 10 is implemented at processor privilege level 2 in usual region 4 and monitors each of first anomaly detector 12, second anomaly detector 14, and log transmitter 18. Specifically, after activation of first anomaly detector 12, second anomaly detector 14, and log transmitter 18, integrated monitor 10 performs constant integrity verification for each of first anomaly detector 12, second anomaly detector 14, and log transmitter 18 by repeatedly performing integrity verification for each of first anomaly detector 12, second anomaly detector 14, and log transmitter 18. When it is verified that at least one of first anomaly detector 12, second anomaly detector 14, or log transmitter 18 has an integrity anomaly, integrated monitor 10 generates a monitoring log that indicates the verification result. Note that integrated monitor 10 may generate a monitoring log that indicates the verification result when it is verified that at least one of first anomaly detector 12, second anomaly detector 14, or log transmitter 18 has no integrity anomaly.

First anomaly detector 12 is implemented at processor privilege level 0 in usual region 4 and is constituted by a host-based intrusion detection system (HIDS), for example. First anomaly detector 12 detects the presence or absence of an anomaly (a false behavior of a program, for example) in information processing device 2. When detecting an anomaly in information processing device 2, the first anomaly detector generates a monitoring log that indicates the detection result. Note that first anomaly detector 12 may generate a monitoring log that indicates the detection result when first anomaly detector 12 detects the absence of an anomaly in information processing device 2.

Second anomaly detector 14 is implemented at processor privilege level 1 in usual region 4 and is constituted by HIDS, for example. Second anomaly detector 14 detects the presence or absence of an anomaly in information processing device 2. When detecting an anomaly in information processing device 2, second anomaly detector 14 generates a monitoring log that indicates the detection result. Note that second anomaly detector 14 may generate a monitoring log that indicates the detection result when second anomaly detector 14 detects the absence of an anomaly in information processing device 2.

Note that although each of first anomaly detector 12 and second anomaly detector 14 is constituted by HIDS in the present embodiment, this is not intended to be limiting. For example, each of first anomaly detector 12 and second anomaly detector 14 may be a network-based intrusion detection system (NIDS).

Log storage 16 is a memory that stores the monitoring log generated by each of root monitor 8, integrated monitor 10, first anomaly detector 12, and second anomaly detector 14.

Log transmitter 18 is implemented at processor privilege level 0 in usual region 4. Log transmitter 18 can communicate with security operation center (SOC) 24 (an example of an external device) located outside the vehicle on which information processing device 2 is mounted, for example, wirelessly via a network. Note that in the present embodiment, log transmitter 18 is a module that is implemented not to be the first part to be attacked in the event of an external attack (such as intrusion of a malware program) on information processing device 2.

As illustrated in FIG. 2, log transmitter 18 transmits a plurality of monitoring logs (denoted as "log" in FIG. 2) stored in log storage 16 to SOC 24 with period T (one second, for example) (an example of a first period) via a network. That is, log transmitter 18 transmits a plurality of monitoring logs stored in log storage 16 to SOC 24 at a predetermined first timing via a network. Thus, by analyzing the monitoring logs received from information processing device 2, SOC 24 can detect that an anomaly has occurred in information processing device 2.

In the example illustrated in FIG. 2, after transmitting a plurality of monitoring logs at point in time t1, log transmitter 18 transmits a plurality of monitoring logs enclosed in the dashed line box at point in time t2 (=point in time t1+period T). Specifically, the plurality of monitoring logs transmitted at point in time t2 by log transmitter 18 are a plurality of monitoring logs that are generated by root monitor 8, integrated monitor 10, first anomaly detector 12, and second anomaly detector 14 and stored in log storage 16 between point in time t1 and point in time t2.

Referring back to FIG. 1, determiner 20 is implemented at processor privilege level 1 in usual region 4. When an anomaly due to an attack has occurred in at least one of integrated monitor 10, first anomaly detector 12, or second anomaly detector 14, determiner 20 determines the intrusion depth, which indicates the degree of progress of the attack, based on the monitoring logs stored in log storage 16.

Specifically, by reference to first countermeasure information 26, such as one illustrated in FIG. 3, determiner 20 determines the intrusion depth based on the monitoring logs stored in log storage 16. First countermeasure information 26 is a data table that indicates an association between anomaly locations and intrusion depths in information processing device 2.

Here, the intrusion depth is an index of the degree of intrusion of an attack into information processing device 2. As illustrated in FIG. 4, when the intrusion location of an attack is a location at processor privilege level 0 (specifically, the location of first anomaly detector 12), the intrusion depth can be expressed as "level 0", which means the shallowest intrusion depth. When the intrusion location of an attack is a location at processor privilege level 1 (specifically, the location of second anomaly detector 14), the intrusion depth can be expressed as "level 1", which means the second shallowest intrusion depth. When the intrusion location of an attack is a location at processor privilege level 2 (specifically, the location of integrated monitor 10), the intrusion depth can be expressed as "level 2", which means the second deepest intrusion depth. When the intrusion location of an attack is a location at processor privilege level 3 (specifically, the location of root monitor 8), the intrusion depth can be expressed as "level 3", which means the deepest intrusion depth. As described above, in the present embodiment, the intrusion depth is expressed by four levels "level 0" to "level 3", "level 0" meaning the shallowest intrusion depth, and "level 3" meaning the deepest intrusion depth.

Referring back to FIG. 3, in the first row of first countermeasure information 26, the anomaly location "first anomaly detector" and the intrusion depth "level 0" are associated and stored. Furthermore, in the second row of first countermeasure information 26, the anomaly location "second anomaly detector" and the intrusion depth "level 1" are associated and stored. Furthermore, in the third row of first countermeasure information 26, the anomaly location "integrated monitor" and the intrusion depth "level 2" are associated and stored. Furthermore, in the fourth row of first countermeasure information 26, the anomaly location "first anomaly detector+second anomaly detector" and the intrusion depth "level 1" are associated and stored. Furthermore, in the fifth row of first countermeasure information 26, the anomaly location "first anomaly detector+integrated monitor" and the intrusion depth "level 2" are associated and stored.

For example, when an anomaly due to an attack has occurred in first anomaly detector 12, determiner 20 refers to first countermeasure information 26 and determines that the intrusion depth is "level 0" based on the monitoring logs stored in log storage 16. Furthermore, for example, when an anomaly due to an attack has occurred in both first anomaly detector 12 and integrated monitor 10, determiner 20 refers to first countermeasure information 26 and determines that the intrusion depth is "level 2" based on the monitoring logs stored in log storage 16.

Referring back to FIG. 1, transmission controller 22 is implemented at processor privilege level 1 in usual region 4. When an anomaly due to an attack has occurred in at least one of integrated monitor 10, first anomaly detector 12, or second anomaly detector 14, transmission controller 22 changes the period with which log transmitter 18 transmits monitoring logs from period T to a period shorter than period T (an example of a second period), based on the intrusion depth determined by determiner 20. In other words, based on the intrusion depth, transmission controller 22 changes the timing at which log transmitter 18 transmits monitoring logs from the first timing to a second timing, which is earlier than the first timing.

Specifically, transmission controller 22 refers to second countermeasure information 28, such as one illustrated in FIG. 5, and changes the period with which log transmitter 18 transmits monitoring logs based on the intrusion depth determined by determiner 20. Second countermeasure information 28 is a data table that indicates an association between intrusion depths and changes of transmission period.

In the example illustrated in FIG. 5, in the first row of second countermeasure information 28, the intrusion depth "level 0" and the change of transmission period "reduce to half" are associated and stored. Furthermore, in the second row of second countermeasure information 28, the intrusion depth "level 1" and the change of transmission period "reduce to quarter" are associated and stored. Furthermore, in the third row of second countermeasure information 28, the intrusion depth "level 2" and the change of transmission period "immediate transmission" are associated and stored.

For example, when the intrusion depth determined by determiner 20 is "level 0", transmission controller 22 refers to second countermeasure information 28 and changes the period with which log transmitter 18 transmits monitoring logs from period T to period T/2, which is shorter than period T. Furthermore, for example, when the intrusion depth determined by determiner 20 is "level 2", transmission controller 22 refers to second countermeasure information 28 and changes the period with which log transmitter 18 transmits monitoring logs from period T to immediate transmission. That is, as the intrusion depth becomes deeper, transmission controller 22 reduces the period with which log transmitter 18 transmits monitoring logs.

1-2. Operation of Information Processing Device

Figure 7:
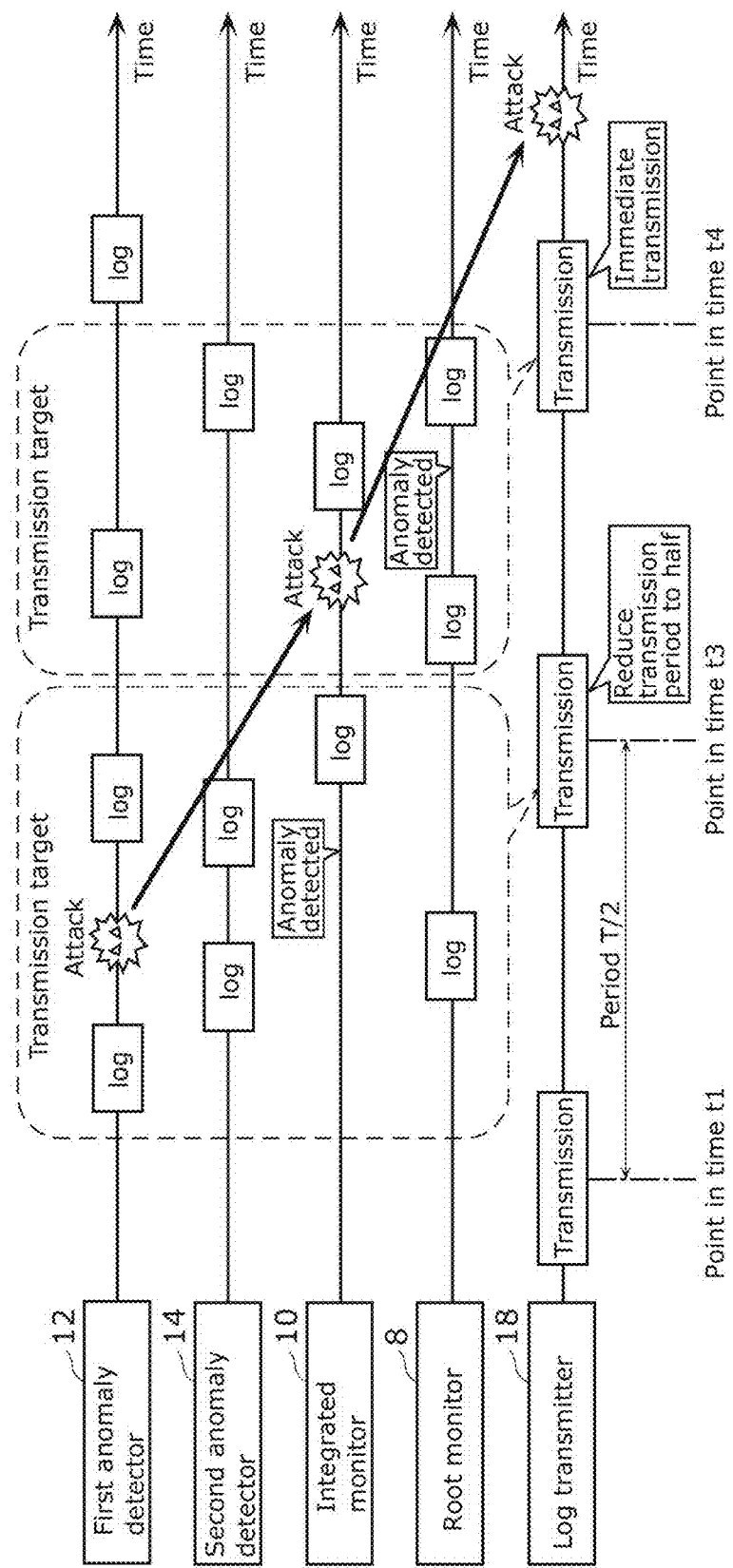
FIG. 7 is a timing chart for describing a transmission process for monitoring logs by the log transmitter in the event of an attack on the information processing device according to Embodiment 1.

Next, with reference to FIGS. 6 and 7, an operation of information processing device 2 according to Embodiment 1 will be described. FIG. 6 is a flowchart illustrating a flow of an operation of information processing device 2 according to Embodiment 1. FIG. 7 is a timing chart for describing a transmission process for monitoring logs by log transmitter 18 in the event of an attack on information processing device 2 according to Embodiment 1.

As illustrated in FIG. 6, when information processing device 2 is activated (S101), transmission controller 22 sets the transmission period for transmission of monitoring logs by log transmitter 18 at period T (S102). Each of root monitor 8, integrated monitor 10, first anomaly detector 12, and second anomaly detector 14 then performs integrity verification for a monitored entity (S103). When the monitored entity has no integrity anomaly (NO in S104), the process returns to step S103 described above.

On the other hand, when the monitored entity has an integrity anomaly (YES in S104), at least one of root monitor 8, integrated monitor 10, first anomaly detector 12, or second anomaly detector 14 generates a monitoring log and stores the monitoring log in log storage 16 (S105). For example, when integrated monitor 10 verifies that first anomaly detector 12 has an integrity anomaly, integrated monitor 10 generates a monitoring log and stores the monitoring log in log storage 16. Alternatively, for example, when root monitor 8 verifies that integrated monitor 10 has an integrity anomaly, root monitor 8 generates a monitoring log and stores the monitoring log in log storage 16.

Determiner 20 then refers to first countermeasure information 26 and determines the intrusion depth based on the monitoring logs stored in log storage 16 (S106). Transmission controller 22 then refers to second countermeasure information 28 and determines, based on the intrusion depth determined by determiner 20, whether or not the transmission period for transmission of monitoring logs by log transmitter 18 needs to be changed (S107). When the transmission period needs to be changed (YES in S107), transmission controller 22 changes the transmission period of transmission of monitoring logs by log transmitter 18 (S108). Log transmitter 18 then transmits monitoring logs with the changed transmission period (S109).

For example, when an attack intrudes into information processing device 2 at the location of first anomaly detector 12 in a period between point in time t1 and point in time t3 (<point in time t2) as illustrated in FIG. 7, integrated monitor 10 verifies that first anomaly detector 12 has an integrity anomaly. In this case, since the anomaly location in information processing device 2 is first anomaly detector 12, determiner 20 refers to first countermeasure information 26 and determines that the intrusion depth is "level 0" based on the monitoring logs stored in log storage 16. Transmission controller 22 then refers to second countermeasure information 28 and changes the transmission period of transmission of monitoring logs by log transmitter 18 from period T to period T/2, based on the intrusion depth "level 0".

This enables log transmitter 18 to transmit a plurality of monitoring logs enclosed in a dashed line box at point in time t3 after transmitting a plurality of monitoring logs at point in time t1. Specifically, the plurality of monitoring logs transmitted at point in time t3 by log transmitter 18 are a plurality of monitoring logs that are generated by root monitor 8, integrated monitor 10, first anomaly detector 12, and second anomaly detector 14 and stored in log storage 16 in the period between point in time t1 and point in time t3.

Furthermore, when the attack further intrudes from the location of first anomaly detector 12 to the location of integrated monitor 10 in a period between point in time t3 and point in time t4 (<point in time t2) as illustrated in FIG. 7, root monitor 8 verifies that integrated monitor 10 has an integrity anomaly. In this case, since the anomaly location in information processing device 2 is integrated monitor 10, determiner 20 refers to first countermeasure information 26 and determines that the intrusion depth is "level 2" based on the monitoring logs stored in log storage 16. Transmission controller 22 then refers to second countermeasure information 28 and changes the transmission period of transmission of monitoring logs by log transmitter 18 from period T to immediate transmission, based on the intrusion depth "level 2".

This enables log transmitter 18 to transmit, at point in time t4 immediately after the determination that the intrusion depth is "level 2" by determiner 20, a plurality of monitoring logs enclosed in a dashed line box after transmitting a plurality of monitoring logs at point in time t3. Specifically, the plurality of monitoring logs transmitted at point in time t4 by log transmitter 18 are a plurality of monitoring logs that are generated by root monitor 8, integrated monitor 10, first anomaly detector 12, and second anomaly detector 14 and stored in log storage 16 in the period between point in time t3 and point in time t4.

Note that when the attack further intrudes from the location of integrated monitor 10 to the location of log transmitter 18 after point in time t4, the transmission process for monitoring logs by log transmitter 18 may be disabled. However, as described above, until period T elapses (in other words, until the transmission process is disabled) since point in time t1 at which a plurality of monitoring logs are transmitted, log transmitter 18 can transmit, to SOC 24, a plurality of monitoring logs that indicate the verification result that integrated monitor 10 and first anomaly detector 12 each have an integrity anomaly. This allows SOC 24 to detect that an anomaly has occurred in information processing device 2 by analyzing the monitoring logs received from information processing device 2.

Referring back to the flowchart of FIG. 6, after step S109, when continuing operation of information processing device 2 (YES in S110), the process returns to step S103 described above. On the other hand, when ending operation of information processing device 2 (NO in S110), the flowchart of FIG. 6 ends.

Note that when transmission controller 22 determines, in step S107 described above, that the transmission period of transmission of monitoring logs by log transmitter 18 does not need to be changed (NO in S107), the transmission period is not changed, and the process proceeds to step S109. Specifically, for example, suppose a case where after an anomaly due to an attack occurs in second anomaly detector 14, and transmission controller 22 changes the transmission period of transmission of monitoring logs by log transmitter 18 from period T to period T/4, an anomaly due to another attack occurs in first anomaly detector 12. In such a case, the transmission period can be maintained at period T/4, and therefore, transmission controller 22 determines that the transmission period of transmission of monitoring logs by log transmitter 18 does not need to be changed.

1-3. Advantageous Effects

Figure 8:
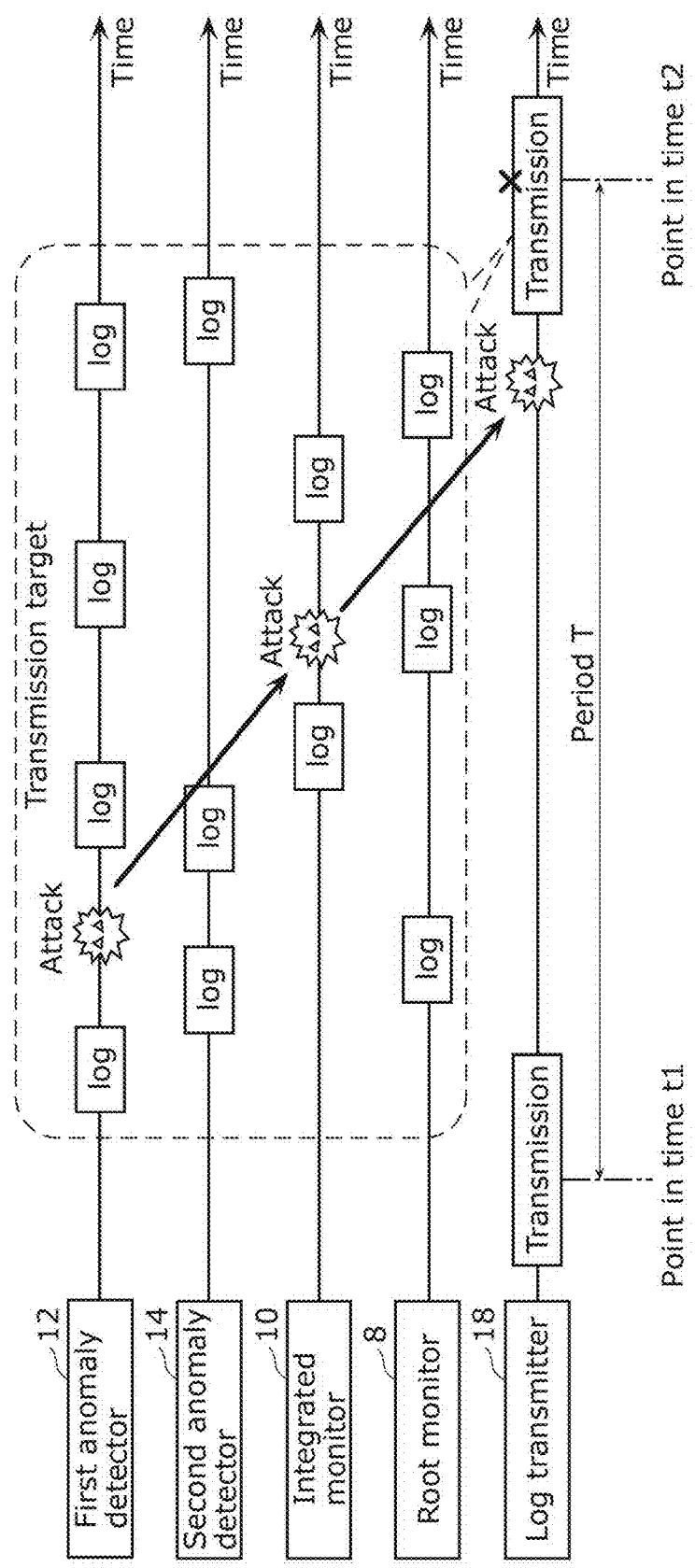
FIG. 8 is a timing chart for describing a transmission process for monitoring logs by a log transmitter in the event of an attack on an information processing device according to a comparative example.

Here, with reference to FIG. 8, an operation of an information processing device according to a comparative example will be described. FIG. 8 is a timing chart for describing a transmission process for monitoring logs by log transmitter 18 in the event of an attack on the information processing device according to the comparative example. Note that in FIG. 8, the same constituent elements as those in the present embodiment are denoted by the same reference numerals, and descriptions thereof will be omitted.

The information processing device according to the comparative example does not include determiner 20 and transmission controller 22 according to the present embodiment. Therefore, the transmission period of transmission of monitoring logs by log transmitter 18 is constantly period T.

When an attack intrudes from the location of first anomaly detector 12 to the location of log transmitter 18 via the location of integrated monitor 10 until period T elapses since point in time t1 at which a plurality of monitoring logs are transmitted as illustrated in FIG. 8, the transmission process for monitoring logs by log transmitter 18 may be disabled. If the transmission process is disabled, log transmitter 18 cannot transmit, to SOC 24, a plurality of monitoring logs that indicate the verification result that integrated monitor 10 and first anomaly detector 12 each have an integrity anomaly. As a result, a problem arises that SOC 24 cannot detect that the anomaly has occurred in information processing device 2.

To the contrary, according to the present embodiment, when an anomaly due to an attack occurs in at least one of integrated monitor 10, first anomaly detector 12, or second anomaly detector 14 until period T elapses since point in time t1 at which a plurality of monitoring logs are transmitted, transmission controller 22 changes the period of transmission of monitoring logs by log transmitter 18 from period T to a period shorter than period T based on the intrusion depth determined by determiner 20. This enables log transmitter 18 to transmit, to SOC 24 before the transmission process is disabled by the attack, a plurality of monitoring logs that indicate the verification result that at least one of integrated monitor 10, first anomaly detector 12, or second anomaly detector 14 has an integrity anomaly. Thus, by analyzing the monitoring logs received from information processing device 2, SOC 24 can detect the presence of the anomaly in information processing device 2.

Therefore, according to the present embodiment, when an anomaly due to an attack occurs, monitoring logs that indicate the occurrence of the anomaly can be transmitted early to SOC 24 by log transmitter 18.

Embodiment 2

2-1. Configuration of Information Processing Device

Figure 9:
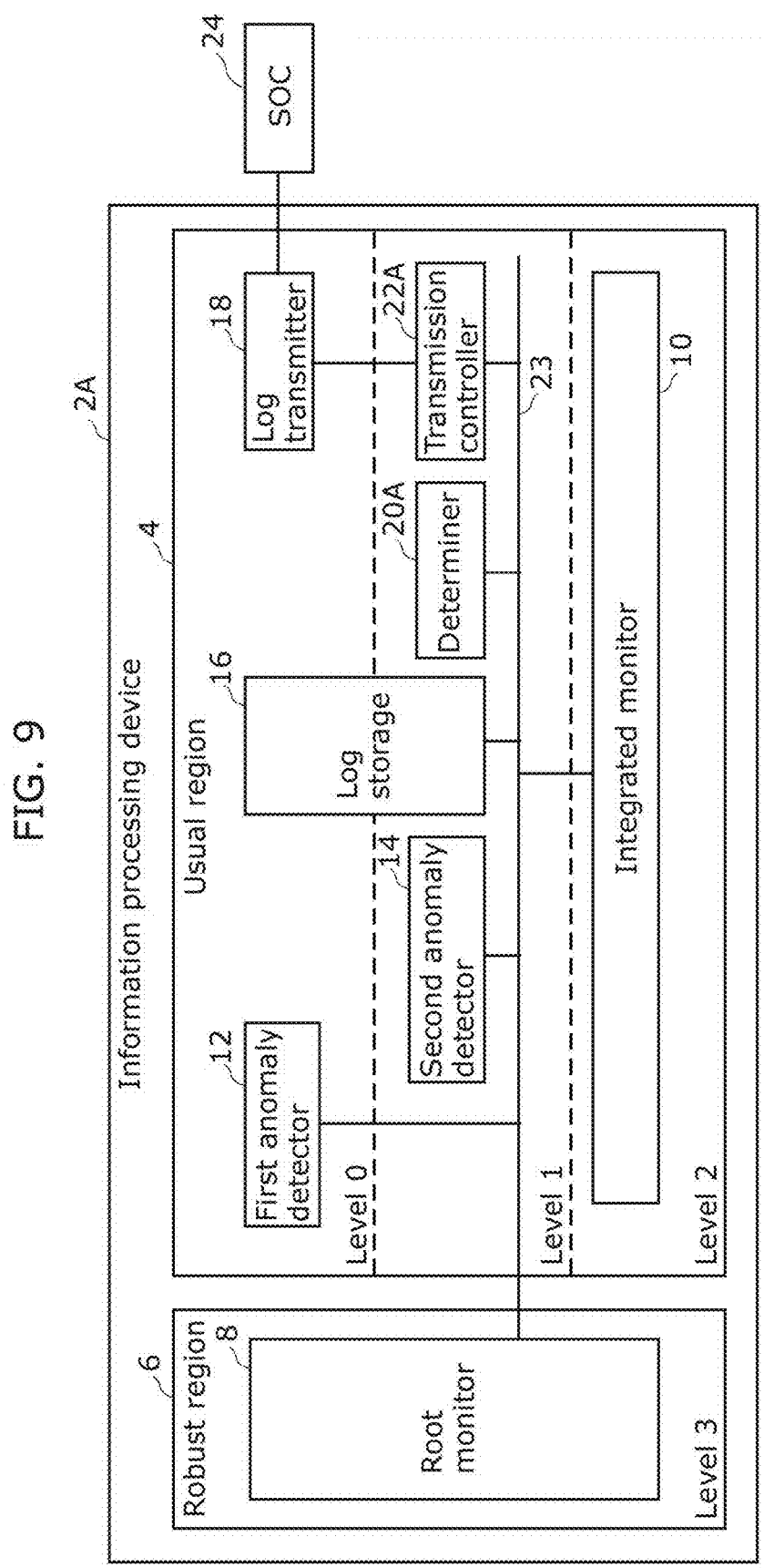
FIG. 9 is a block diagram illustrating a configuration of an information processing device according to Embodiment 2.
Figures 10, 11:
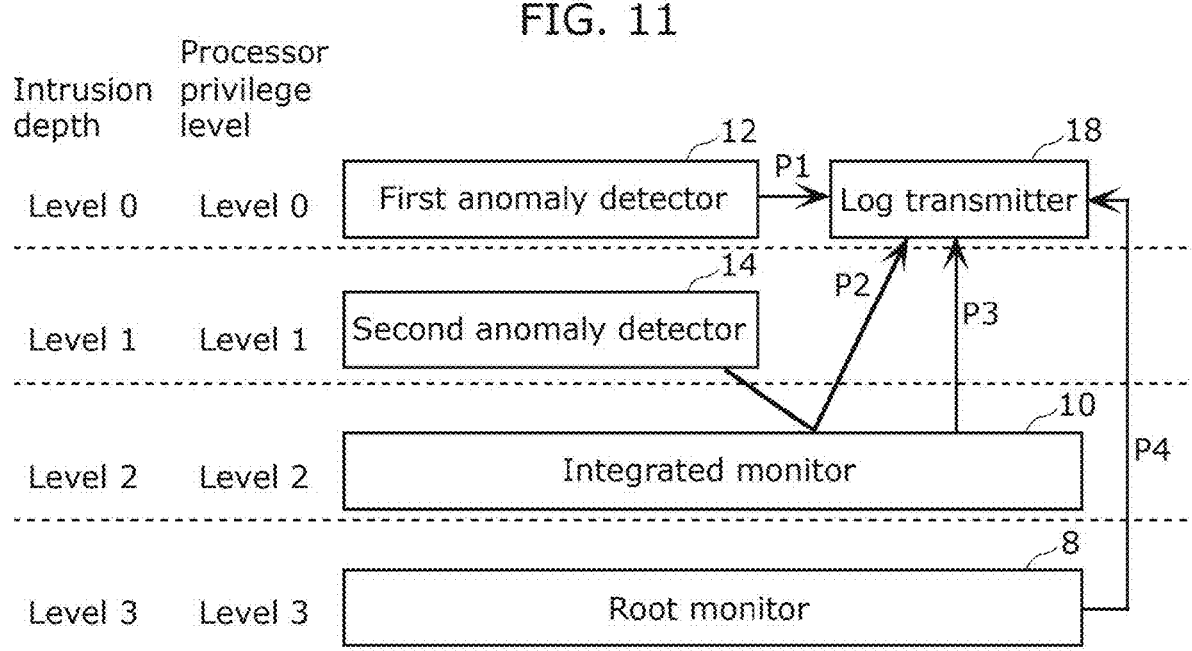
FIG. 10 is a diagram illustrating an example of log path information according to Embodiment 2.
FIG. 11 is a diagram for describing effective paths.

With reference to FIGS. 9 to 11, a configuration of information processing device 2A according to Embodiment 2 will be described. FIG. 9 is a block diagram illustrating a configuration of information processing device 2A according to Embodiment 2. FIG. 10 is a diagram illustrating an example of log path information 30 according to Embodiment 2. FIG. 11 is a diagram for describing effective paths.

Note that in the present embodiment, the same constituent elements as those in Embodiment 1 described above are denoted by the same reference numerals, and descriptions thereof will be omitted.

As illustrated in FIG. 9, information processing device 2A according to Embodiment 2 differs from the information processing device according to Embodiment 1 in processing in determiner 20A and transmission controller 22A.

Determiner 20A performs the processing described below, in addition to the processing described above in Embodiment 1. Specifically, when an anomaly due to an attack has occurred in at least one of integrated monitor 10, first anomaly detector 12, or second anomaly detector 14, determiner 20A determines an effective path based on the monitoring logs stored in log storage 16. The effective path is a transmission path that has not been subjected to attack intrusion for sending monitoring logs from each of root monitor 8, integrated monitor 10, first anomaly detector 12, and second anomaly detector 14 to log transmitter 18.

Specifically, determiner 20A refers to log path information 30, such as one illustrated in FIG. 10, and determines an effective path based on the monitoring logs stored in log storage 16. Log path information 30 is a data table that indicates an association between anomaly locations and effective paths in information processing device 2A.

In the present embodiment, there are four effective paths denoted as "P1" to "P4". As illustrated in FIG. 11, effective path "P1" is a path for directly sending monitoring logs from first anomaly detector 12 to log transmitter 18. Effective path "P2" is a path for sending monitoring logs from second anomaly detector 14 to log transmitter 18 via integrated monitor 10. Effective path "P3" is a path for directly sending monitoring logs from integrated monitor 10 to log transmitter 18. Effective path "P4" is a path for directly sending monitoring logs from root monitor 8 to log transmitter 18.

Referring back to FIG. 10, in the first row of log path information 30, the anomaly location "first anomaly detector" and the effective paths "P1", "P3", and "P4" are associated and stored. Furthermore, in the second row of log path information 30, the anomaly location "second anomaly detector" and the effective paths "P1", "P3", and "P4" are associated and stored. Furthermore, in the third row of log path information 30, the anomaly location "integrated monitor" and the effective paths "P1" and "P4" are associated and stored. Furthermore, in the fourth row of log path information 30, the anomaly location "first anomaly detector+ second anomaly detector" and the effective paths "P3" and "P4" are associated and stored. Furthermore, in the fifth row of log path information 30, the anomaly location "first anomaly detector+integrated monitor" and the effective path "P4" are associated and stored.

For example, when an anomaly due to an attack has occurred in first anomaly detector 12, determiner 20A refers to log path information 30 and determines effective paths "P2", "P3", and "P4" based on the monitoring logs stored in log storage 16. Each of the determined effective paths "P2", "P3", and "P4" is a path that does not pass through first anomaly detector 12 that has been subjected to attack intrusion.

Furthermore, for example, when an anomaly due to an attack has occurred in each of integrated monitor 10 and first anomaly detector 12, determiner 20A refers to log path information 30 and determines effective path "P4" based on the monitoring logs stored in log storage 16. The determined effective path "P4" is a path that does not pass through any of integrated monitor 10 and first anomaly detector 12 that have been subjected to attack intrusion.

Referring back to FIG. 9, transmission controller 22A performs the processing described below, in addition to the processing described above in Embodiment 1. Specifically, when an anomaly due to an attack has occurred in at least one of integrated monitor 10, first anomaly detector 12, or second anomaly detector 14, transmission controller 22A extracts (collects) a monitoring log generated on an effective path (an example of a particular monitoring log) as a transmission target of log transmitter 18 from among the plurality of monitoring logs stored in log storage 16, based on the effective paths determined by determiner 20A.

For example, when an anomaly due to an attack has occurred in first anomaly detector 12, transmission controller 22A extracts, as transmission targets of log transmitter 18, monitoring logs generated on effective paths "P2", "P3", and "P4" determined by determiner 20A (specifically, monitoring logs generated by root monitor 8, integrated monitor 10, and second anomaly detector 14).

Furthermore, for example, when an anomaly due to an attack has occurred in integrated monitor 10, transmission controller 22A extracts, as transmission targets of log transmitter 18, monitoring logs generated on effective paths "P1" and "P4" determined by determiner 20A (specifically, monitoring logs generated by root monitor 8 and first anomaly detector 12).

2-2. Operation of Information Processing Device

Figure 12:
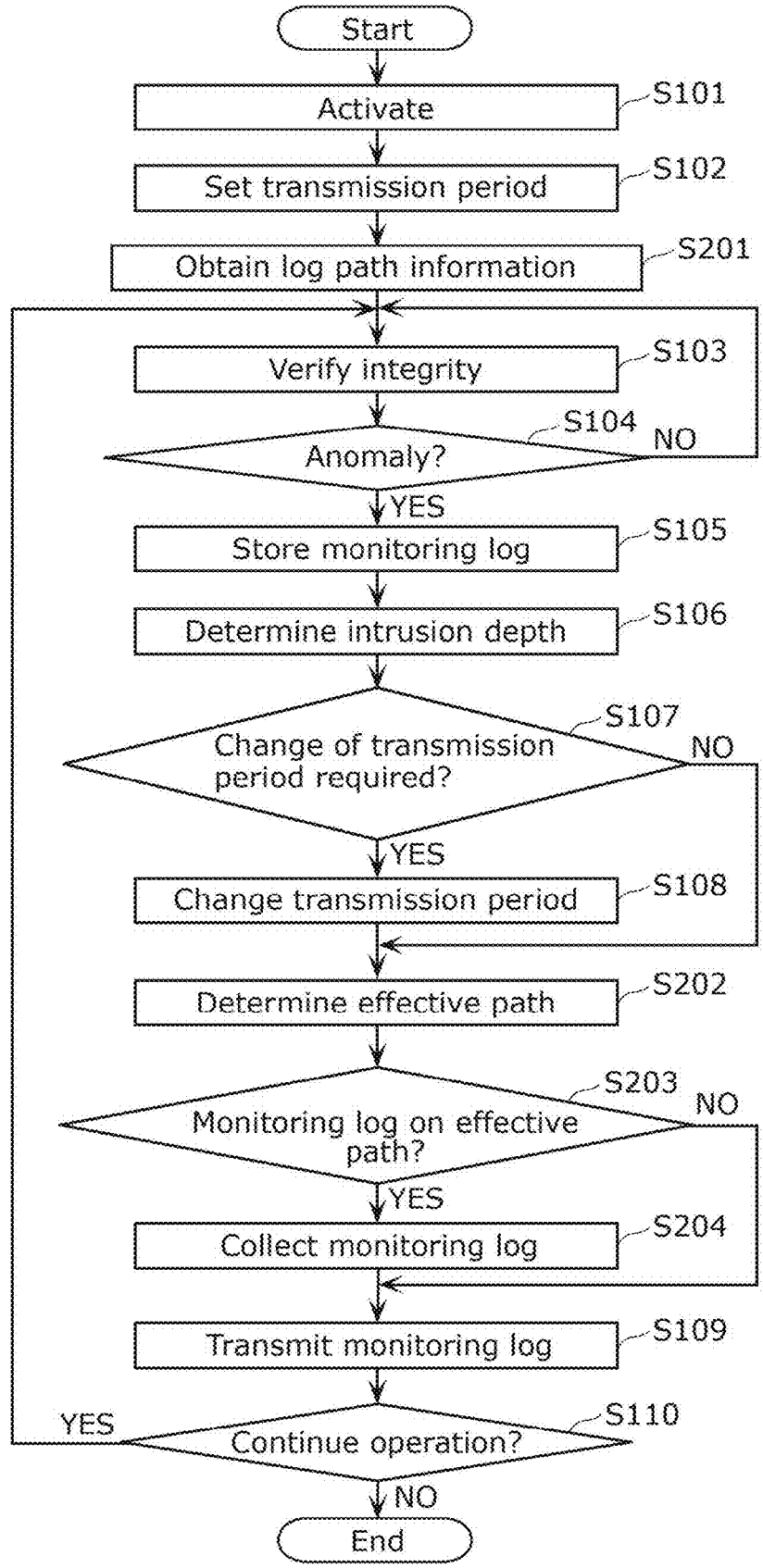
FIG. 12 is a flowchart illustrating a flow of an operation of the information processing device according to Embodiment 2.
Figure 13:
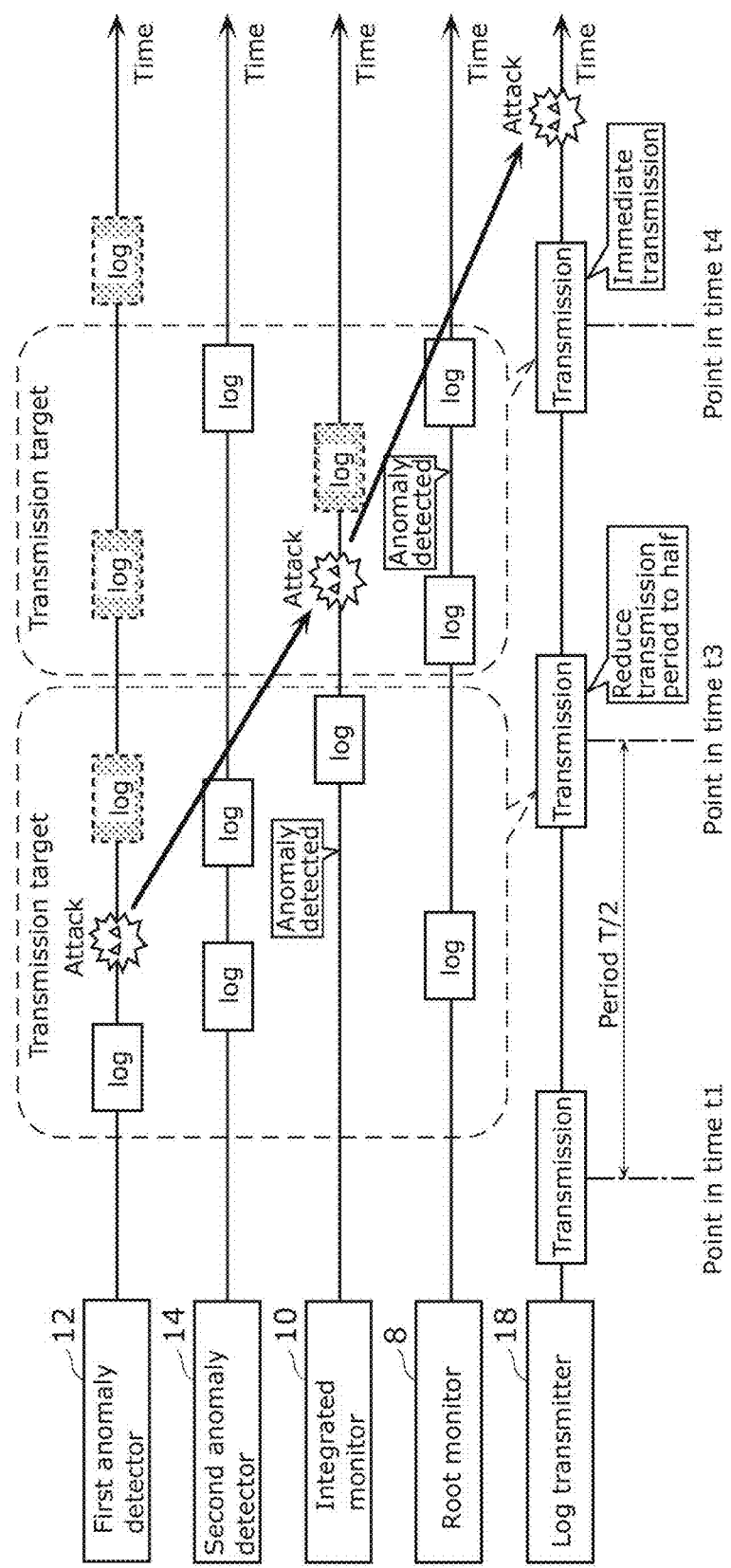
FIG. 13 is a timing chart for describing a transmission process for monitoring logs by a log transmitter in the event of an attack on the information processing device according to Embodiment 2.

Next, with reference to FIGS. 12 and 13, an operation of information processing device 2A according to Embodiment 2 will be described. FIG. 12 is a flowchart illustrating a flow of an operation of information processing device 2A according to Embodiment 2. FIG. 13 is a timing chart for describing a transmission process for monitoring logs by log transmitter 18 in the event of an attack on information processing device 2A according to Embodiment 2. Note that in the flowchart of FIG. 12, the same processes as those in the flowchart of FIG. 6 described above in Embodiment 1 are denoted by the same step numbers, and descriptions thereof will be omitted.

As illustrated in FIG. 12, as in Embodiment 1 described above, steps S101 and S102 are first performed. After step S102, determiner 20A obtains log path information 30 (S201). Then, as in Embodiment 1 described above, steps S103 to S108 are performed.

After step S108, determiner 20A determines an effective path based on the monitoring logs stored in log storage 26 (S202). Transmission controller 22A then determines whether or not there is a monitoring log on the effective path determined by determiner 20A (S203).

When there is a monitoring log on the effective path (YES in S203), transmission controller 22A extracts (collects), based on the effective path determined by determiner 20A, a monitoring log generated on the effective path from among the plurality of monitoring logs stored in log storage 16 (S204). Log transmitter 18 then transmits, to SOC 24, the monitoring log extracted by transmission controller 22A (S109). The process then proceeds to step S110.

For example, when an attack intrudes into information processing device 2A at the location of first anomaly detector 12 in a period between point in time t1 and point in time t3 (<point in time t2) as illustrated in FIG. 13, integrated monitor 10 verifies that first anomaly detector 12 has an integrity anomaly. In this case, since the anomaly location in information processing device 2A is first anomaly detector 12, determiner 20A refers to log path information 30 and determines effective paths "P2", "P3", and "P4" based on the monitoring logs stored in log storage 16. Transmission controller 22A then extracts monitoring logs generated on effective paths "P2", "P3", and "P4" determined by determiner 20A (specifically, monitoring logs generated by root monitor 8, integrated monitor 10, and second anomaly detector 14) from among the plurality of monitoring logs stored in log storage 16.

This enables log transmitter 18 to transmit, at point in time t3 after transmitting a plurality of monitoring logs at point in time t1, a plurality of monitoring logs extracted by transmission controller 22A enclosed in a dashed line box. Specifically, the plurality of monitoring logs transmitted at point in time t3 by log transmitter 18 are a plurality of monitoring logs that are generated by root monitor 8, integrated monitor 10, and second anomaly detector 14 and stored in log storage 16 in the period between point in time t1 and point in time t3.

Referring back to the flowchart of FIG. 12, when there is no monitoring log on the effective path in step S203 described above (NO in S203), transmission controller 22A does not extract any monitoring log generated on the effective path, and the process proceeds to step S109. In this case, the plurality of monitoring logs transmitted at point in time t3 by log transmitter 18 are a plurality of monitoring logs that are generated by root monitor 8, integrated monitor 10, first anomaly detector 12, and second anomaly detector 14 and stored in log storage 16 in the period between point in time t1 and point in time t3.

2-3. Advantageous Effects

In the present embodiment, as described above, when an anomaly due to an attack has occurred in at least one of integrated monitor 10, first anomaly detector 12, or second anomaly detector 14, transmission controller 22A extracts, as a transmission target of log transmitter 18, a monitoring log generated on the effective path from among the plurality of monitoring logs stored in log storage 16. In this way, the amount of monitoring logs transmitted by log transmitter 18 can be reduced. As a result, when an anomaly due to an attack has occurred, log transmitter 18 can transmit, to SOC 24 earlier, a monitoring log that indicates the occurrence of the anomaly.

Other Variations Etc.

An information processing device and a method for controlling an information processing device according to one or more aspects have been described above based on the above embodiments, but the present disclosure is not limited to the above embodiments. The one or more aspects may include forms achieved by making various modifications to the above embodiments that can be conceived by those skilled in the art, as well as forms achieved by combining constituent elements in different embodiments, without materially departing from the spirit of the present disclosure.

Although in the embodiments described above, determiner 20 (20A) and transmission controller 22 (22A) are placed at processor privilege level 1, this is not intended to be limiting. Determiner 20 (20A) and transmission controller 22 (22A) may be placed at a higher processor privilege level 2 or 3.

Furthermore, although in the embodiments described above, integrated monitor 10 monitors each of first anomaly detector 12, second anomaly detector 14, and log transmitter 18, this is not intended to be limiting. In addition to these, integrated monitor 10 may monitor determiner 20 (20A) and transmission controller 22 (22A). Furthermore, determiner 20 (20A) and transmission controller 22 (22A) may be configured to be activated when integrated monitor 10 has no integrity anomaly.

Furthermore, although in the embodiments described above, the transmission period of transmission of monitoring logs by log transmitter 18 is period T, this is not intended to be limiting. Depending on the security level of the region in which log transmitter 18, determiner 20 (20A), and transmission controller 22 (22A) are placed, the transmission period of transmission of monitoring logs by log transmitter 18 may be changed. For example, the higher the security level of the region in which log transmitter 18, determiner 20 (20A), and transmission controller 22 (22A) are placed, the shorter the transmission period of transmission of monitoring logs by log transmitter 18 can be.

Note that, in the above embodiments, the constituent elements may be configured in the form of dedicated hardware or may be implemented by executing a computer program suited to the constituent elements. The constituent elements may be implemented by a program executor such as a CPU or a processor reading out and executing the computer program recorded on a recording medium such as a hard disk or semiconductor memory.

Some or all of the functions of information processing devices 2 and 2A according to the above embodiments may be achieved by a processor such as a CPU executing a computer program.

Some or all of the constituent elements included in each device described above may be configured as an IC card that is detachably attached to each device, or as a stand-alone module. The IC card and the module are computer systems each including a microprocessor, ROM, and RAM, for example. The IC card and the module may include the super-multifunction LSI circuit described above. The IC card and the module achieve their function as a result of the microprocessor operating according to a computer program. The IC card and the module may be tamperproof.

The present disclosure may be the methods described above. In addition, the present disclosure may be a computer program that implements these methods with a computer, or a digital signal that includes the computer program. The present disclosure may also be implemented as a non-transitory computer-readable recording medium, such as a flexible disk, a hard disk, a CD-ROM, an MO, a DVD, a DVD-ROM, DVD-RAM, a Blu-Ray™ Disc (BD), semiconductor memory, etc., having recording thereon the computer program or the digital signal. Moreover, the present disclosure may also be implemented as the digital signal recorded on these recording media. In addition, the present disclosure may transmit the computer program or the digital signal via, for example, a telecommunication line, a wireless or wired communication line, a network such as the Internet, or data broadcasting. The present disclosure may also be implemented as a computer system including (i) memory having the computer program stored therein and (ii) a microprocessor that operates according to the computer program. In addition, the computer program or the digital signal may be implemented by another independent computer system by recording the computer program or the digital signal on the recording medium and transporting it, or by transporting the computer program or the digital signal via the network, etc.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-153920 filed on Sep. 27, 2022 and PCT International Application No. PCT/JP2023/022567 filed on Jun. 19, 2023.

INDUSTRIAL APPLICABILITY

The present disclosure is applicable to, for example, an information processing device for performing constant integrity verification for various programs in an in-vehicle network.

The invention claimed is:

1. An information processing device comprising a processor that is configured to execute:
 a storage that stores a monitoring log generated in the information processing device;
 a transmitter that communicates with an external device and transmits the monitoring log stored in the storage to the external device at a first timing;
 an anomaly detector program that detects a presence or absence of an anomaly in the information processing device and generates the monitoring log that indicates a detection result;
 a first monitor that verifies an integrity of each of the transmitter and the anomaly detector program and generates a first monitoring log that indicates a verification result;
 a second monitor that verifies an integrity of the first monitor and generates a second monitoring log that indicates a verification result;
 a determiner program that determines an intrusion depth that indicates a degree of progress of an attack based on the monitoring log stored in the storage when an anomaly due to the attack occurs in at least one of the anomaly detector program or the first monitor; and
 a transmission controller program that changes, based on the intrusion depth, a timing of transmission of the monitoring log by the transmitter from the first timing to a second timing that is earlier than the first timing when the anomaly due to the attack occurs in at least one of the anomaly detector program or the first monitor;
 wherein when the anomaly due to the attack occurs in at least one of the anomaly detector program or the first monitor, the transmission controller program changes, based on a level of the intrusion depth, a period of transmission of the monitoring log by the transmitter from the first period to a second period that is shorter than the first period, and
 wherein when the anomaly due to the attack occurs in at least one of the anomaly detector program or the first monitor, the determiner program further determines an effective path that is a path that has not been subjected to an attack intrusion.

2. The information processing device according to claim 1, wherein the transmitter transmits the monitoring log to the external device within a first period, and
 wherein the period of transmission at a predetermined higher level of the intrusion depth is shortened to an immediate period of transmission.

3. The information processing device according to claim 1, wherein the transmission controller program sets the second period to make the second period shorter as the intrusion depth is deeper.

4. The information processing device according to claim 1, wherein when the anomaly due to the attack occurs in at least one of the anomaly detector program or the first monitor, the transmission controller program further extracts, as a transmission target of the transmitter, a particular monitoring log generated on the effective path from among one or more monitoring logs stored in the storage based on the effective path.

5. A method for controlling an information processing device, the information processing device including a processor configured to:
   storing, by a storage, of a monitoring log generated in the information processing device;
   communicating, by a transmitter, with an external device and transmitting the monitoring log stored in the storage to the external device at a first timing;
   detecting, by an anomaly detector program, a presence or absence of an anomaly in the information processing device and generating the monitoring log that indicates a detection result;
   verifying, by a first monitor, that an integrity of each of the transmitter and the anomaly detector program and generating a first monitoring log that indicates a verification result;
   verifying, by a second monitor, that verifies an integrity of the first monitor and generating a second monitoring log that indicates a verification result;
   determining, by a determiner program, an intrusion depth that indicates a degree of progress of an attack based on the monitoring log stored in the storage when an anomaly due to the attack occurs in at least one of the anomaly detector program or the first monitor; and
   changing, by a transmission controller program, based on the intrusion depth, a timing of transmission of the monitoring log by the transmitter from the first timing to a second timing that is earlier than the first timing when the anomaly due to the attack occurs in at least one of the anomaly detector program or the first monitor;
   wherein when the anomaly due to the attack occurs in at least one of the anomaly detector program or the first monitor, the transmission controller program changes, based on a level of the intrusion depth, a period of transmission of the monitoring log by the transmitter from the first period to a second period that is shorter than the first period, and
   wherein when the anomaly due to the attack occurs in at least one of the anomaly detector program or the first monitor, the determiner program further determines an effective path that is a path that has not been subjected to an attack intrusion.

6. The method according to claim 5, wherein the period of transmission at a predetermined higher level of the intrusion depth is shortened to an immediate period of transmission.

7. An information processing device comprising:
   a storage that stores a monitoring log generated in the information processing device;
   a transmitter that communicates with an external device and transmits the monitoring log stored in the storage to the external device at a first timing;
   an anomaly detector program that detects a presence or absence of an anomaly in the information processing device and generates the monitoring log that indicates a detection result;
   a first monitor that verifies an integrity of each of the transmitter and the anomaly detector program and generates a first monitoring log that indicates a verification result;
   a second monitor that verifies an integrity of the first monitor and generates a second monitoring log that indicates a verification result;
   a determiner program that determines an intrusion depth that indicates a degree of progress of an attack based on the monitoring log stored in the storage when an anomaly due to the attack occurs in at least one of the anomaly detector program or the first monitor; and
   a transmission controller program that changes, based on the intrusion depth, a timing of transmission of the monitoring log by the transmitter from the first timing to a second timing that is earlier than the first timing when the anomaly due to the attack occurs in at least one of the anomaly detector program or the first monitor;
   wherein the transmitter transmits the monitoring log to the external device within a first period,
   wherein when the intrusion depth is a first depth, the transmission controller changes a period of transmission of the monitoring log by the transmitter from the first period to a second period that is shorter than the first period, and
   wherein when the intrusion depth is a second depth that is deeper than the first depth, the transmission controller program changes the period of transmission of the monitoring log by the transmitter from the second period to a third period that is shorter than the second period.

* * * * *